United States Patent Office.

HENRY C. BORGNER, OF LEBANON, PENNSYLVANIA.

Letters Patent No. 99,823, dated February 15, 1870.

IMPROVED INDIGO SOAP.

The Schedule referred to in these Letters Patent and making part of the same.

To all whom it may concern:

Be it known that I, HENRY C. BORGNER, of Lebanon, in the county of Lebanon, and State of Pennsylvania, have invented a new and valuable Improvement in Soap; and I do hereby declare that the following is a full, clear, and exact description of the same.

My invention relates to the manufacture of soap; and

It consists in a novel combination of chemical ingredients, intended to form an improved soap of great value to the laundry.

My improved soap is manufactured as follows, namely:

I take five pounds of bar-soap, and cut it into fine shavings. I then prepare one quart of lye, of soda-ash and water, sufficiently strong to float an egg; I then add one ounce of borate of soda, four drachms of pearlash, four ounces of rosin; one pound of soap-bark infusion, and mix all the ingredients together by stirring in a vessel over a slow fire until they are dissolved.

After the mass is reduced to a solution, I remove it from the fire, and suffer it to cool gradually, and while the cooling process is going on I add four ounces of spirits of turpentine, four ounces of benzine, two ounces of alcohol, four ounces of $ffff$ ammonia, two ounces of glycerine, and one scruple of indigo. While these ingredients are being added, I stir the mixture constantly, and prevent it from scorching. If desirable, perfumery may be added in small quantities.

When compounded as above described, either with or without the perfumery, the mixture may be poured into soap frames or molds, and when thoroughly cold is ready for use.

In manufacturing my soap, I sometimes find it necessary to vary the quantities of some of the ingredients thereof, for the reason that they are known to vary in quality and strength, but if all the chemicals used are of the ordinary quality, the formula given will be found very nearly correct.

What I claim as my invention is—

The combination of bar-soap, lye, borate of soda, pearlash, rosin, soap-bark infusion, spirits of turpentine, benzine, alcohol, ammonia, glycerine, and indigo, in the manner and proportions and for the purpose specified, substantially as described.

In testimony that I claim the above, I have hereunto subscribed my name in the presence of two witnesses.

HENRY C. BORGNER.

Witnesses:
BASSLER BOYER,
A. S. LIGHT.